US009021149B2

(12) United States Patent
Nagata

(10) Patent No.: US 9,021,149 B2
(45) Date of Patent: Apr. 28, 2015

(54) INFORMATION DISPLAY APPARATUS, DISPLAY SYSTEM, AND INFORMATION DISPLAY METHOD

(75) Inventor: Akiko Nagata, Yamato-Koriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 399 days.

(21) Appl. No.: 12/142,831

(22) Filed: Jun. 20, 2008

(65) Prior Publication Data

US 2009/0006661 A1 Jan. 1, 2009

(30) Foreign Application Priority Data

Jun. 29, 2007 (JP) ................................. 2007-171838

(51) Int. Cl.
*G06F 3/00* (2006.01)
*G06F 3/0488* (2013.01)
*G06F 3/038* (2013.01)
(52) U.S. Cl.
CPC ............ *G06F 3/04883* (2013.01); *G06F 3/038* (2013.01); *G06F 2203/0381* (2013.01)
(58) Field of Classification Search
USPC ..................................... 710/8, 14, 15, 18, 19
See application file for complete search history.

(56) References Cited

U.S. PATENT DOCUMENTS

| 5,572,728 | A | * | 11/1996 | Tada et al. ............................... 1/1 |
| 6,518,960 | B2 | * | 2/2003 | Omura et al. ................. 345/177 |
| 2002/0063797 | A1 | | 5/2002 | Aratani et al. |
| 2004/0139052 | A1 | * | 7/2004 | Kazushige et al. ............... 707/1 |
| 2004/0217946 | A1 | * | 11/2004 | Hamano ........................ 345/173 |
| 2006/0242591 | A1 | * | 10/2006 | Van Dok et al. .............. 715/762 |
| 2007/0171273 | A1 | * | 7/2007 | Saleh et al. ................ 348/14.08 |

FOREIGN PATENT DOCUMENTS

| JP | 10-126560 | 5/1998 |
| JP | 2000-056747 | 2/2000 |
| JP | 2002/135676 | 5/2002 |
| JP | 2003-016088 | 1/2003 |

OTHER PUBLICATIONS

Liles, Bennett, "Technology Showcase: Electronic White Boards." Mar. 1, 2004, SVR (Sound & Video Contractor), pp. 1-7 http://svconline.com/mag/avinstall_electronic_white_boards.*

* cited by examiner

*Primary Examiner* — Idriss N Alrobaye
*Assistant Examiner* — Dayton Lewis-Taylor
(74) *Attorney, Agent, or Firm* — Renner, Otto, Boisselle & Sklar, LLP

(57) ABSTRACT

In an electronic conference system, an information display apparatus is provided, that allows to proceed with a conference efficiently even if performing a capturing of electronic data during the conference. The information display apparatus has a display device that is provided with a plurality of display modes and available for an electronic conference system, in which a connection of a data input device is monitored, and a processing method for the inputted data from the data input device whose connection has been detected is made different depending on the current display mode. In the processing method, when the display mode is a mode in which the data is editable and the inputted data is image data, the electronic conference system is caused to directly capture the data therein, and in the case except it, a storage dialog for the inputted data is displayed.

1 Claim, 9 Drawing Sheets

INFORMATION DISPLAY APPARATUS, DISPLAY SYSTEM, AND INFORMATION DISPLAY METHOD

CROSS-NOTING PARAGRAPH

This Non-provisional application claims priority under 35 U.S.C. §119(a) on Patent Application No. 2007-171838 filed in JAPAN on Jun. 29, 2007, the entire contents of which are hereby incorporated herein by reference.

FIELD OF THE INVENTION

The present invention relates to an information display apparatus, a display system, and an information display method, particularly, to a technology for displaying information using a large-sized display screen in which a pen input can be performed.

BACKGROUND OF THE INVENTION

Conventionally, a whiteboard is provided with printing means for optically scanning conference contents (image information) written on the whiteboard by writing means such as a marking pen to print the obtained image information on a thermal paper, and using the printing means, the conference contents (image information) written on the whiteboard are printed on a thermal paper after the conference and further copies thereof to be distributed to the conference participants are distributed.

Further, in a conference using the conventional whiteboard, when reusing the printed conference contents to prepare a report, it is required to newly digitize them using a word processor etc., after the conference.

In order to solve the disadvantage above, for example, an electronic conference system is proposed that conference contents are directly written on a large-sized display in a free format using input means such as a touch pen and all of which are digitized, and thereby the document management, distribution to participants, and processing of the contents, after the conference, can be easily performed (Japanese Laid-Open Patent Publication No. 2000-56747).

Further, a method that a material to be used in the conference is prepared as electronic data in advance and directly displayed on a large-sized display through a PC (personal computer) in such an electronic conference system, is also proposed (Japanese Laid-Open Patent Publication No. 2003-16088).

Furthermore, as a method of transmitting a document or a conference material to a PC (personal computer), a method is proposed that when a document is set on a scanner device, a transmission start signal is sent from the scanner device to the PC, and a selection screen for processing electronic data of the received document or conference material is displayed on the display screen in the PC side receiving the transmission start signal (Japanese Laid-Open Patent Publication No. 10-126560).

However, in the electronic conference system using a large-sized display screen, when a conference is being carried out while performing a pen input on the display screen which can be used as a virtual whiteboard, if a participant inputs or displays additional electronic data, the conference needs to be interrupted temporarily and it makes impossible to proceed with the conference smoothly.

SUMMARY OF THE INVENTION

An object of the present invention is to provide an information display apparatus, a display system, and an information display method, that allow to proceed with a conference efficiently even if performing a data capturing during the conference in an electronic conference system.

The information display apparatus of the present invention has a display device that is provided with a plurality of display modes and available for an electronic conference system, and monitors a connection of a data input device by a data input monitoring portion which operates as follows.

First, data is inputted from the data input device whose connection has been detected by the data input portion and the display mode is determined by a display mode determining portion, so that a processing method for the inputted data is made different depending on the determined display mode.

Here, the display modes include a whiteboard mode available as a virtual whiteboard for the electronic conference system, and a mode for causing the inputted data to be stored in a folder.

The processing method of the data is either one of methods below.

(1) When a current display mode is determined to be the whiteboard mode by the display mode determining portion and the inputted data is determined to be image data by a data type determining portion, the inputted data is captured in the electronic conference system by a data transferring portion.

(2) When the current display mode is determined to be other than the whiteboard mode by the display mode determining portion, or when it is determined that the current display mode is the whiteboard mode but the inputted data is other than image data, an operation to store the inputted data is displayed.

Note that, the data input device may comprise a scanner device, a camera, a video camera, a portable telephone, and a recording medium, etc., so that electronic data stored in such data input devices or a document is read by the data input portion.

Further, it is possible to make a program which works a computer as each portion (the data input monitoring portion, the data input portion, the display mode determining portion, the data type determining portion, and the data transferring portion) of the information display apparatus having the configuration above, to store the program in a computer-readable recording medium, and to execute the program on a computer.

PREFERRED EMBODIMENTS OF THE INVENTION

Figure 1:
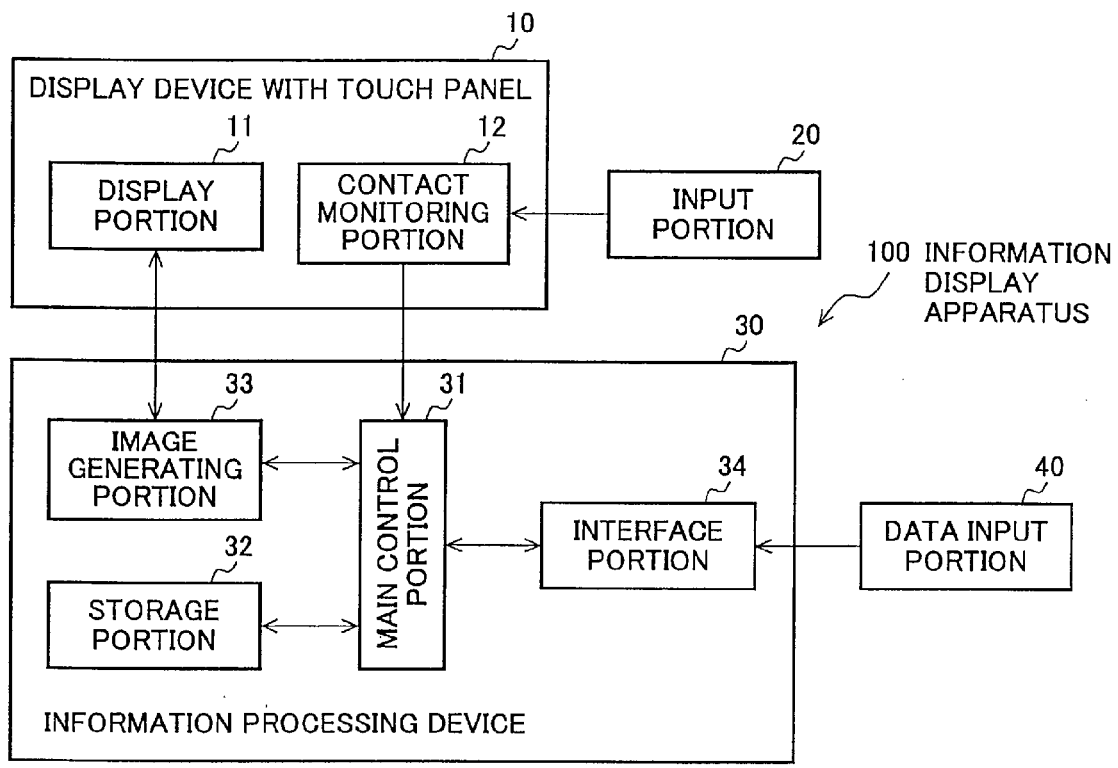
FIG. 1 is a block diagram showing a configuration of an information display apparatus.

Now, referring to the drawings, preferred embodiments according to the present invention will hereinafter be described.

The present invention relates to an information display apparatus comprising a display device and an information processing device. The information display apparatus can be used for an electronic conference system that a conference is carried out while a participant is performing a pen input on a large-sized display screen with touch panel available as a virtual whiteboard.

FIG. 1 is a block diagram showing a configuration of the information display apparatus, where the information display apparatus 100 comprises a display device with touch panel 10, an input portion 20, an information processing device 30, and a data input device 40. In the information display apparatus 100, the display device with touch panel 10 and the information processing device 30 may be configured as separate devices or as an integrated device.

The display device with touch panel 10 comprises a display portion 11 having a large-sized liquid crystal display with touch panel, etc., and a contact monitoring portion 12 that monitors contact state of the input portion 20 with a touch panel.

The display portion 11 displays data received through an interface (not shown) from the information processing device 30 on a large-sized display screen.

The contact monitoring portion 12 monitors a contact of the input portion 20 with the touch panel and the contact position thereof, etc., and transmits the monitor result (contact state and contact position, etc.,) to the information processing device 30 through the interface (not shown).

The input portion 20, which is a pointing device such as an electronic pen, may be a human finger, a pen, or a stick, etc., unless it can contact with the touch panel.

The information processing device 30 is made of a main control portion 31 that controls the whole of the device, a storage portion 32, an image generating portion 33, and an interface portion 34.

The main control portion 31 controls the whole of the device 30 and receives the monitor result transmitted from the contact monitoring portion 12, transmits a command to draw at a contact position to the image generating portion 33, or causes an electronic conference system to perform a pointing operation at the contact position.

The storage portion 32, which is made of, for example, a RAM (Random Access Memory), a ROM (Read Only Memory), and HDD (Hard Disc Drive), etc., stores a control program executed at the main control portion 31, various application programs, or data, or temporarily stores data in the execution of a control program or various application programs.

The image generating portion 33 generates a display image according to the drawing command received from the main control portion 31. The generated display image is transmitted to the display portion 11 through the interface (not shown) and displayed on the large-sized display screen as the drawing result.

The interface portion 34 is an interface to connect the data input device 40 and the information processing device 30. For example, the data input device 40 may be any one of external storage devices including a scanner device, a portable telephone, a camera, a video camera, a PDA (Personal Digital Assistant), a PC (Personal Computer), and a flash memory. And a connecting method thereof may be any one of a USB (Universal Serial Bus) connection, a short-range wireless communication (an infrared ray communication, Bluetooth (registered trademark), Zigbee, etc.,), a serial connection, and a network connection, etc.

When the data input device 40 is connected to the information processing device 30 through the interface portion 34, a connection event is transmitted to the main control portion 31.

Figure 2:
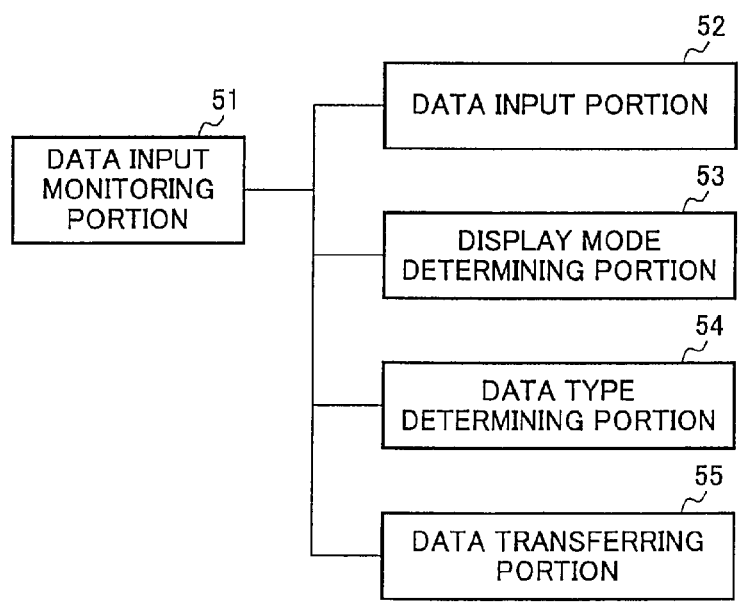
FIG. 2 is a block diagram showing a functional configuration of the information processing device according to an embodiment.

FIG. 2 is a block diagram showing a functional configuration of the information processing device 30 according to the present embodiment. In this figure, the information processing device 30 comprises a data input monitoring portion 51, a data input portion 52, a display mode determining portion 53, a data type determining portion 54, and a data transferring portion 55. The data input monitoring portion 51, the data input portion 52, the display mode determining portion 53, the data type determining portion 54, and the data transferring portion 55 are constituted by a program, which is loaded to a memory such as a RAM from the storage portion 32 and executed by a CPU (Central Processing Unit) of the main control portion 31, so that the function thereof is realized.

Upon receiving an event that the data input device is connected from the main control portion 31, the data input monitoring portion 51 starts the data input portion 52 corresponding to the kind of the connected data input device 40.

The data input portion 52 receives data from the data input device 40 through the interface portion 34 to generate a folder (working folder) with a specified name or a name with the time and date information in the storage portion 32. The data captured in the working folder is recorded with a file name with the time and date information and consecutive number.

When the capturing of the data is completed by the data input portion 52, the data input monitoring portion 51 starts the display mode determining portion 53 to obtain a distinction of a display mode in the electronic conference system.

The display mode determining portion 53 returns the distinction of the display mode obtained by inquiring the electronic conference system to the data input monitoring portion 51.

Figure 3A:
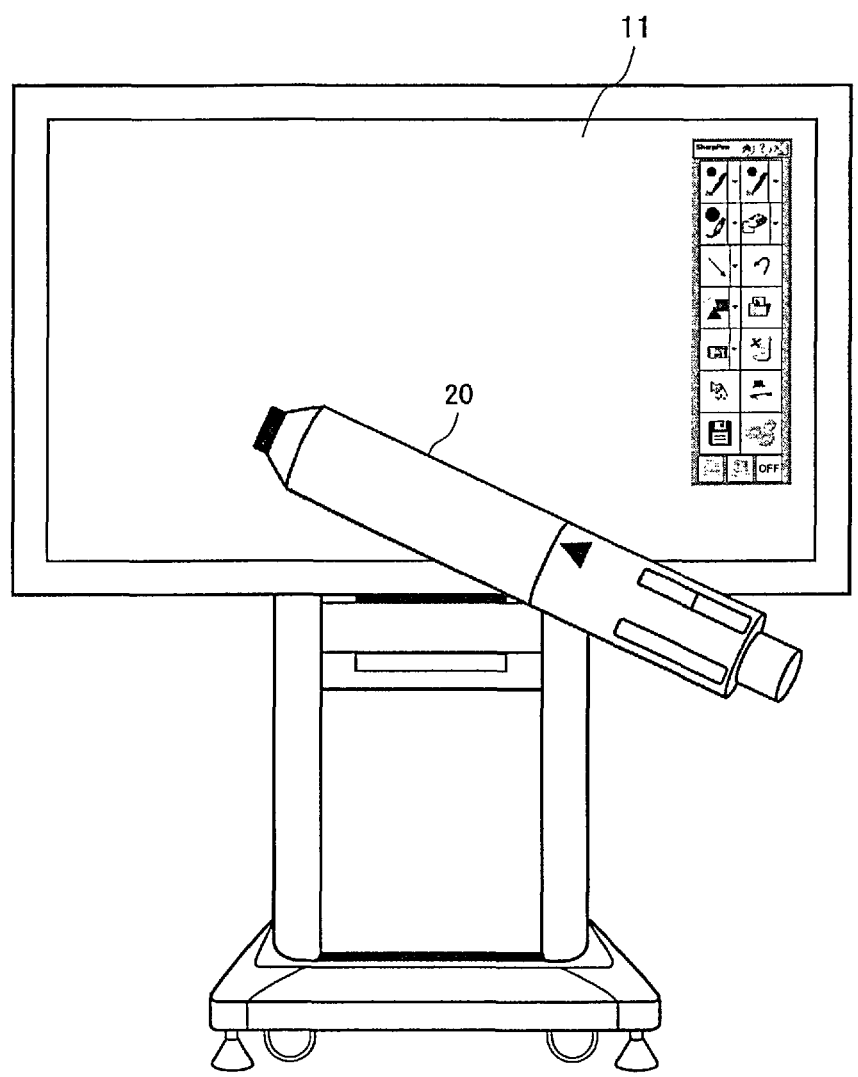
FIGS. 3A to 3C are diagrams illustrating a difference in modes of an electronic conference system.
Figure 3B:
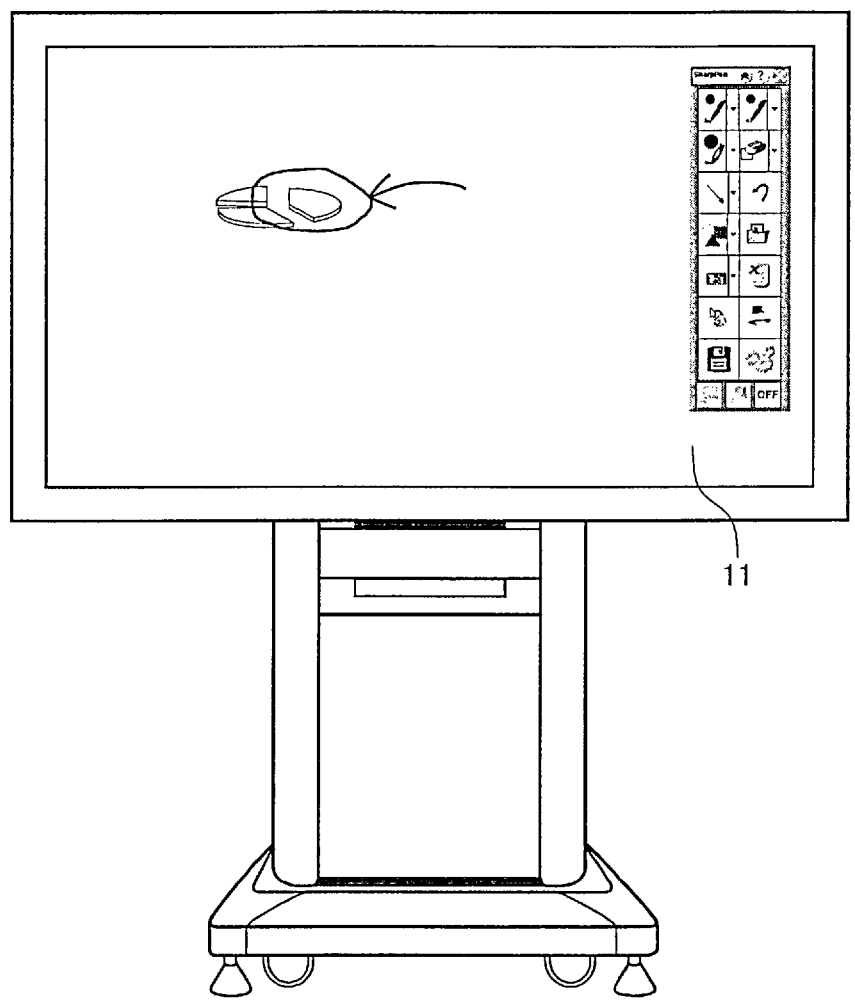
Figure 3C:
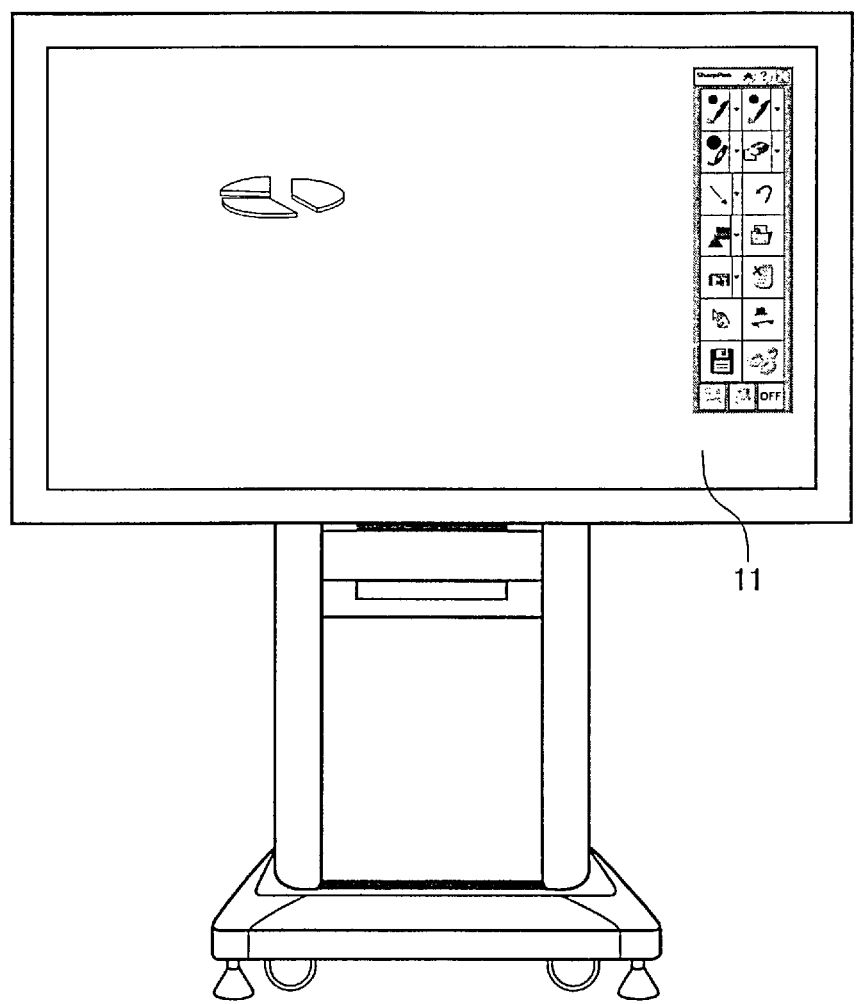

Here, the display modes in the electronic conference system include the following three types as shown in FIGS. 3A to 3C.

(1) Whiteboard Mode (FIG. 3A):
The whiteboard mode creates a pseudo whiteboard environment on the display portion 11, which is used to handwrite characters, draw graphics or straight-lines, or capture an image file as a reference material thereto, similar to conventional conferences, by the input portion 20.

(2) Transparent Board Mode (Basic Mode) (FIG. 3B):
The transparent board mode displays data of an application as it is on the display portion 11, which is used to perform a writing to promote shared understanding by the input portion 20.

(3) Board Off Mode (FIG. 3C)
The board off mode is used to operate an application without performing a handwriting on the display portion 11.

Next, when the distinction of the display mode obtained from the display mode determining portion 53 is the whiteboard mode, the data input monitoring portion 51 starts the data type determining portion 54 to obtain a type of the inputted data.

The data type determining portion 54 obtains the type of the data stored under the working folder generated in the storage portion 32 with a well-known technology.

For example, the data is treated as image data when it is a still image, a dynamic image, or a graphic etc., as text data when it is document data generated by a word processor or a text editor, and as other data when it is other than image data and text data.

Only when the type of the data obtained by the data type determining portion 54 is image data, the data input monitoring portion 51 starts the data transferring portion 55 to transfer all of the files under the working folder as image objects to the electronic conference system.

Figure 4A:
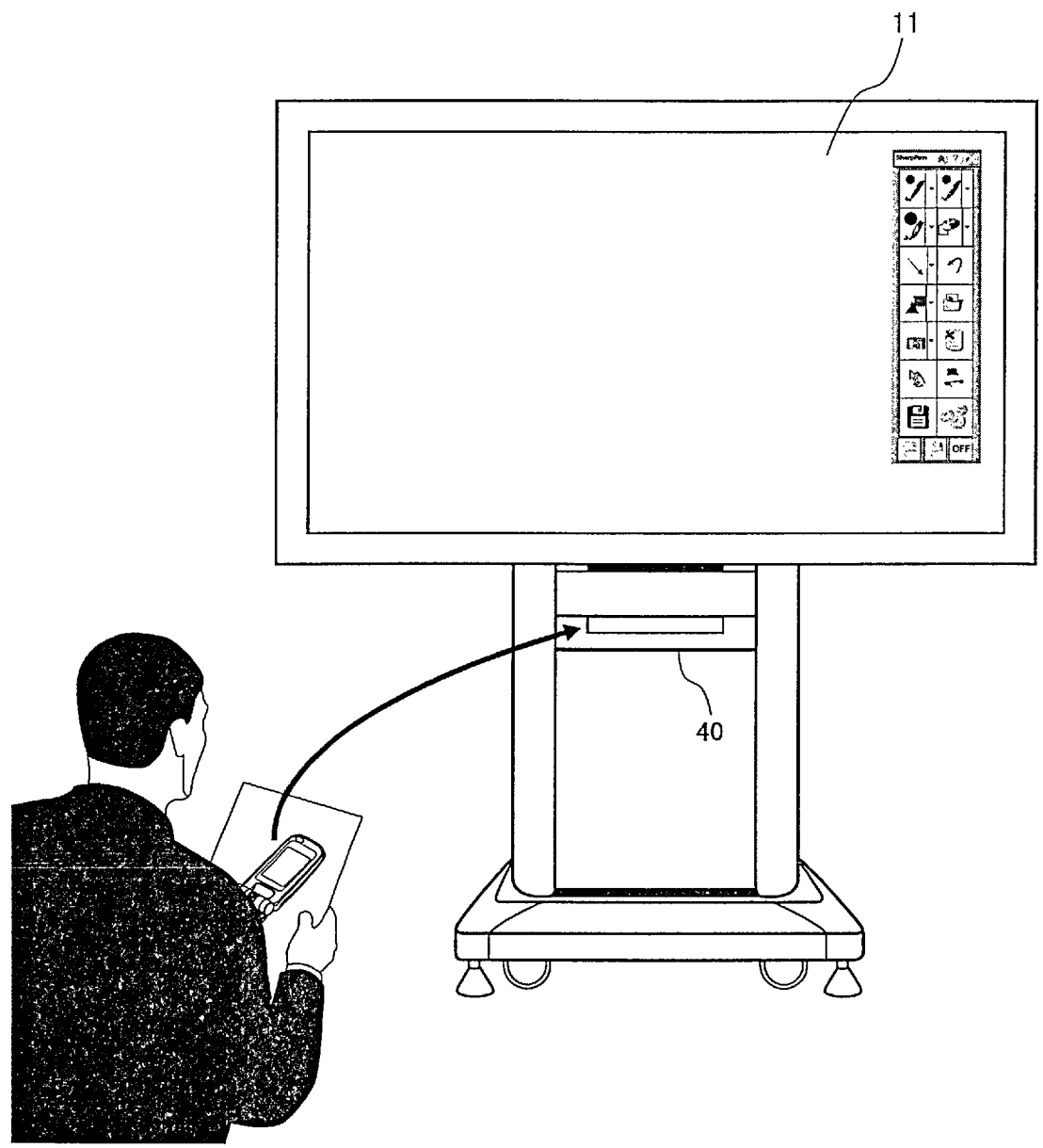
FIGS. 4A and 4B are diagrams illustrating a data input when the electronic conference system is in a whiteboard mode.
Figure 4B:
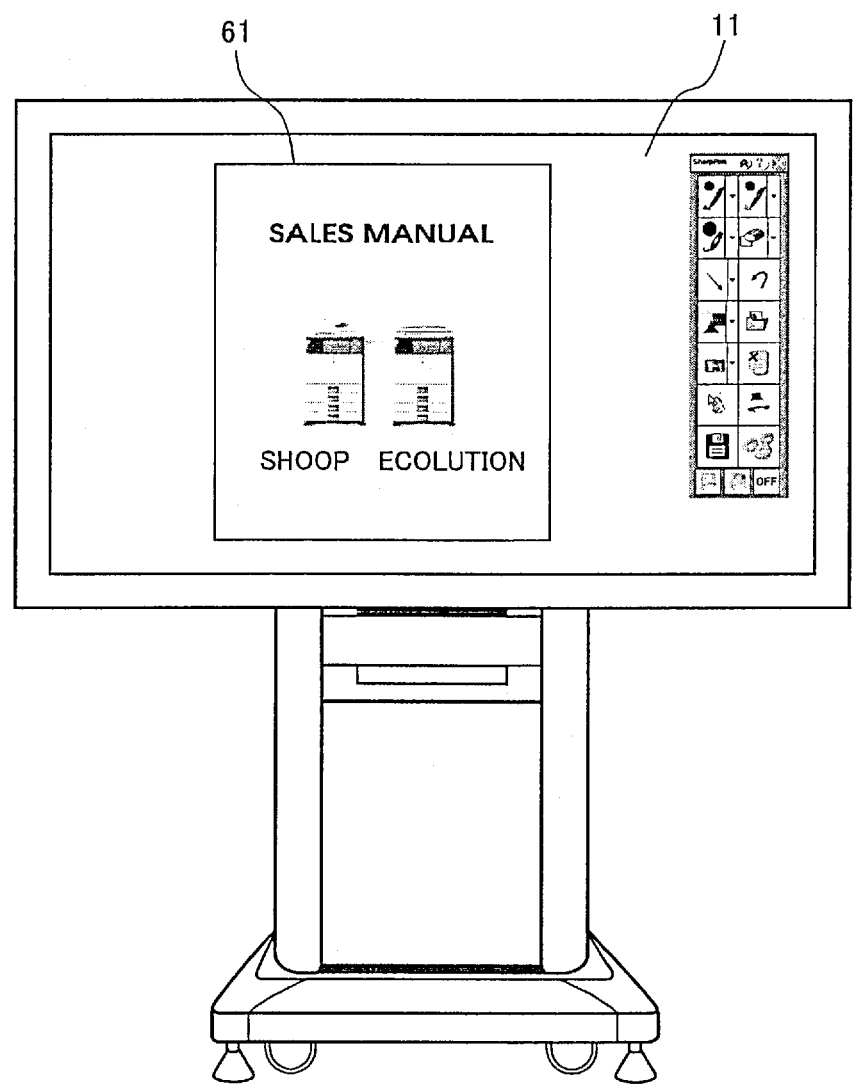

For example, in the whiteboard mode, an image file from a scanner device or external media (infrared ray, removable media, etc.,) is resized into an appropriate size, and captured in the screen of the whiteboard in an editable form like image data 61 (FIG. 4B).

Conventionally, when data is inputted with a display screen of the whiteboard mode being displayed, it has been required to temporarily return from the display screen of the whiteboard mode to that of the basic transparent mode, and to find where the read image has been stored.

However, in the case of the present embodiment, when data is inputted during a conference using the display screen of the whiteboard mode, the data is displayed directly on the display screen, and therefore, there is no need to find where the read image data has been stored, thus making it possible to proceed with the conference smoothly.

Moreover, when the distinction of the display mode obtained from the display mode determining portion 53 is the transparent board mode or the board off mode, or when the display mode is the whiteboard mode but the captured data is not image data (but text data, etc.,), the data input monitoring portion 51 displays a storage dialogue for storing the captured data without performing the capture to the electronic conference system.

Figure 5A:
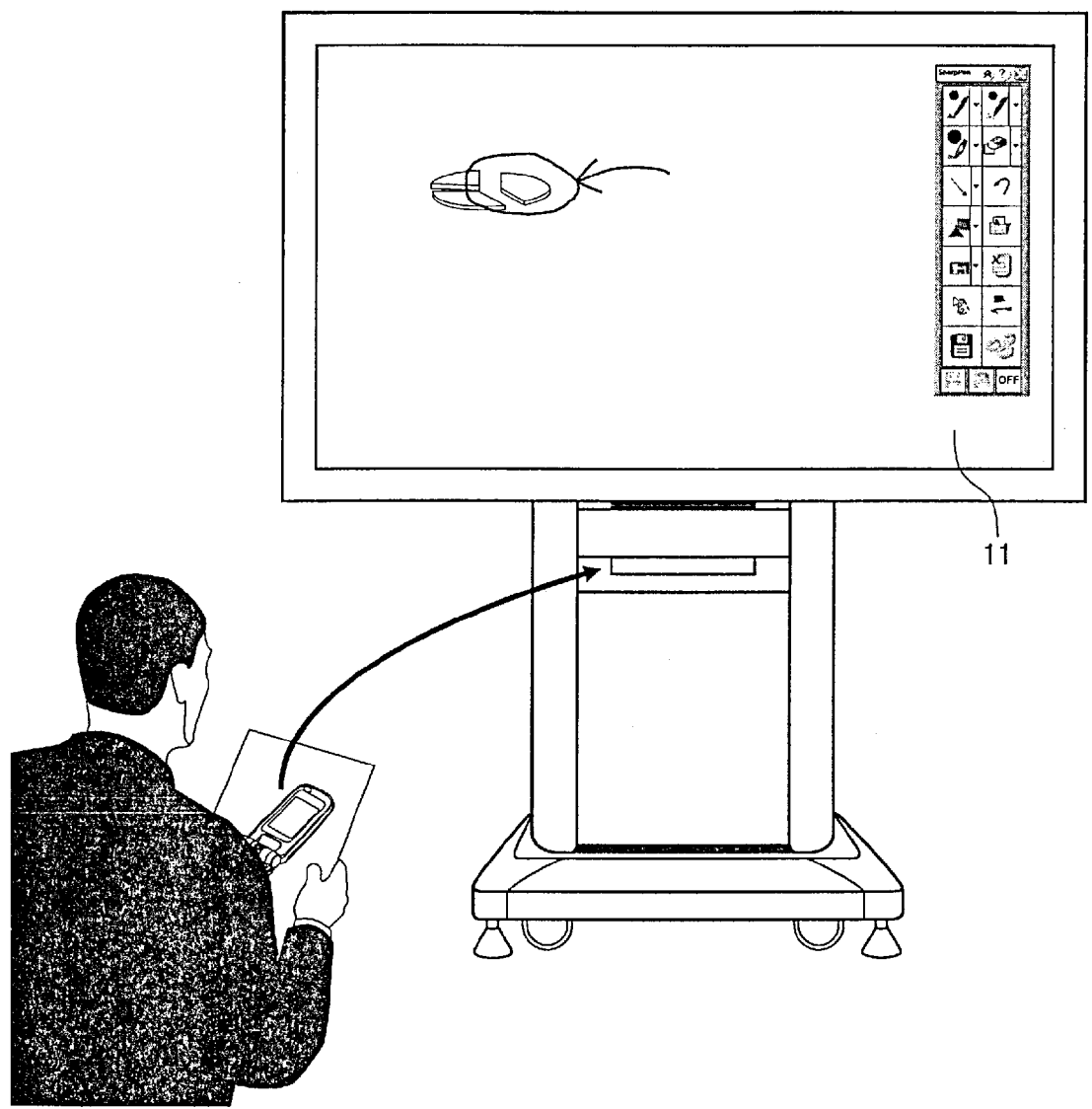
FIGS. 5A and 5B are diagrams illustrating a data input when the electronic conference system is in a mode other than the whiteboard mode.
Figure 5B:
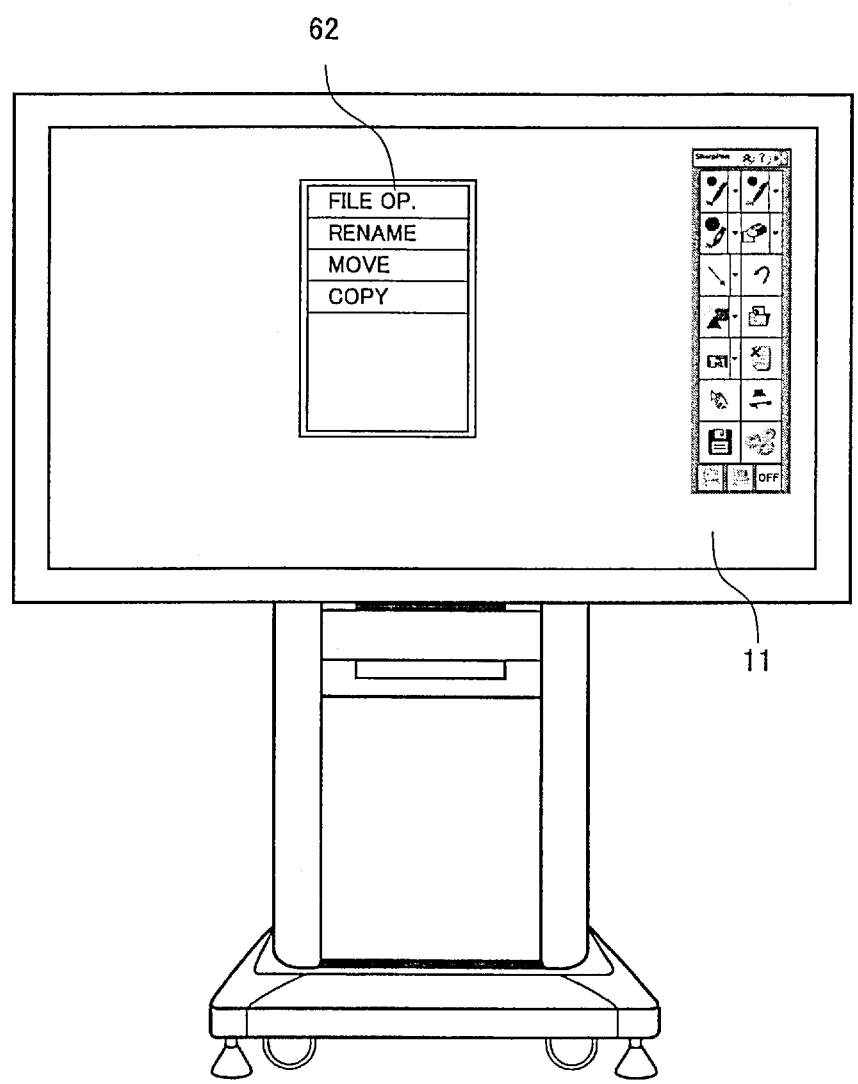

For example, in a mode other than the whiteboard mode (FIG. 5A), a storage dialogue 62 for storing an image file and text data, etc., inputted from a scanner device or external media (infrared ray removable media, etc.,) is displayed (FIG. 5B).

In this way, when it is in the transparent mode or the board off mode, or when the display mode is the whiteboard mode but the captured data is not image data (but text data, etc.,), an operational screen to store the inputted data is displayed, and therefore there is no need for a user to deliberately perform the operation therefor. Note that, if the working folder is the folder of the storage destination, it is possible to do without displaying such a storage dialogue.

Figure 6:
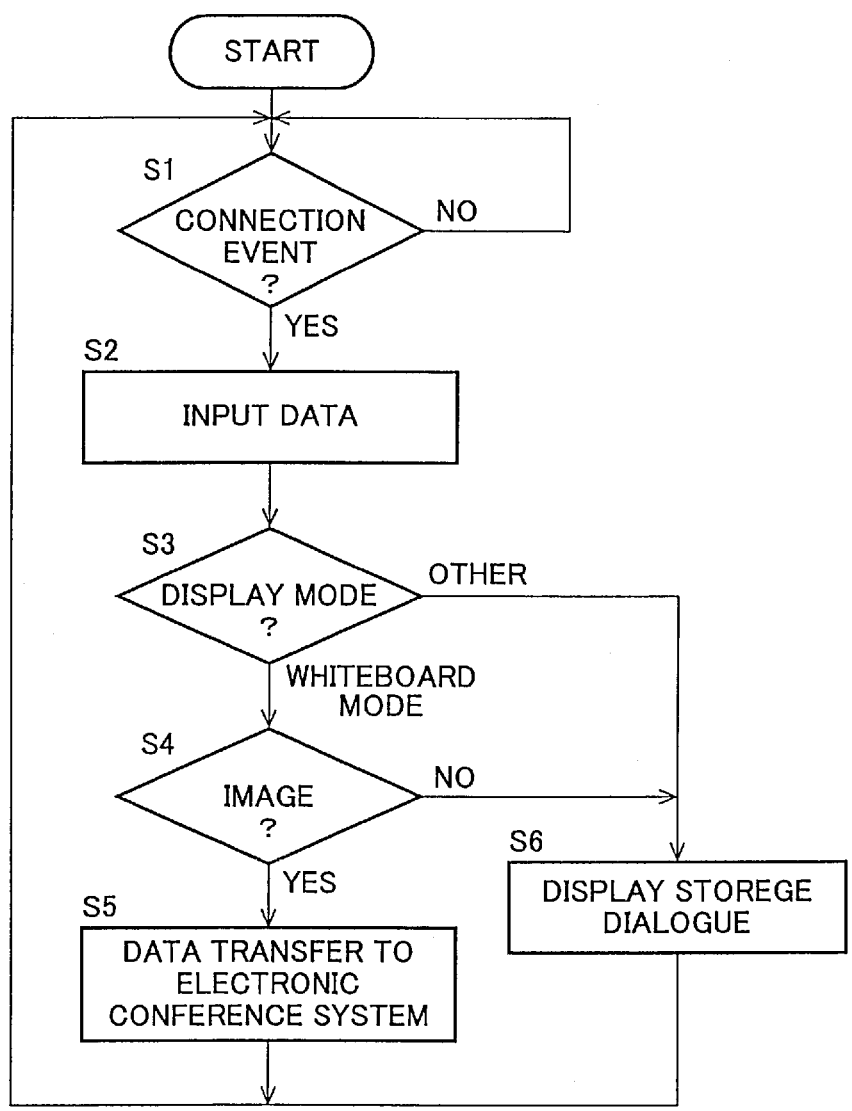
FIG. 6 is a flowchart illustrating an operation in data inputting.

Next, an operation in the data inputting will be described using a flowchart of FIG. 6.

When the main control portion 31 confirms a connection event of the data input device 40, the connection event is provided to the data input monitoring portion 51 (step S1/YES), and the data input monitoring portion 51 starts the data input portion 52 and captures data from the data input device 40 to store in the storage portion 32 (step S2).

For example, as shown in FIG. 4A, when a user sets a document to be inputted on the data input device 40 (a scanner device), a working folder in the storage portion 32 is generated to store the read image data of the document thereunder.

Upon completing the data input, the data input monitoring portion 51 confirms a current display mode by the display mode determining portion 53, and when it is in the whiteboard mode (step S3/"whiteboard mode") and further when the data stored in the storage portion 32 is determined to be image data by the data type determining portion 54 (step S4/YES), the inputted image data is captured in the electronic conference system as an image object by the data transferring portion 55, and the image data 61 is displayed in the electronic conference system as shown in FIG. 4B (step S5), followed by going back to step S1 for the processing of a next connection event.

Alternatively, when the display mode of the electronic conference system is the transparent board mode or the board off mode, or when the mode is the whiteboard mode but the captured data is not image data (but text data, etc.,) (step S3/"others", step S4/NO), a storage dialogue for the inputted data is displayed as shown in FIG. 5B (step S6), followed by going back to step S1 for the processing of a next connection event.

Note that, the present invention is not limited to embodiments described above, and further various changes and modifications can be made without departing from the scope of the present invention. For example, there is no need to say that an object of the present invention is realized such that, as each portion (the data input monitoring portion, the data input portion, the display mode determining portion, the data type determining portion, and the data transferring portion) of the information processing device, for constituting the embodiments described above, a program for causing a computer to function is generated and written in a recording medium in advance, and the programs recorded in the recording medium are stored in a memory provided in the device, or in the storage device, to execute the program. In this case, the program itself that is read from the recording medium realizes the function of the present embodiment described above, and the program and the recording medium that records the same also constitute the present invention.

Further, it is also included when the program described above is executed together with an operating system or other application program, etc.

Note that, the program that realizes the function of the embodiments above may be provided in any forms of recording medium including discs (for example, a magnetic disc and an optical disc, etc.,), cards (for example, a memory card and an optical card, etc.,), semiconductor memories (for example, a ROM and a nonvolatile memory, etc.,), and tapes (for example, a magnetic tape and a cassette tape, etc.,). Moreover, the above-mentioned program stored in the storage device through a network may be provided directly from a server computer. In this case, the storage device of the server computer is also included in the recording medium of the present invention.

In this way, the function of the embodiments above is programmed and distributed, resulting that it is possible to reduce the cost and improve the portability and versatility.

Conventionally, it has been required to temporarily return from the display screen of the whiteboard mode to that of the transparent board mode and find where read image data has been stored.

However, according to the present invention, when image data is inputted during an electronic conference, the data is directly displayed on the display screen, and thereby the conventional labor is eliminated and the conference can proceed smoothly.

Further, according to the present invention, when the data captured during the electronic conference is not image data (but text data etc.,) or when it is not in a mode to edit an image object, an operational screen to store the inputted data is displayed, and therefore, there is no need for a user to deliberately perform the operation therefor. Note that, if the working folder is the folder of the storage destination, it is possible to do without displaying such an operational screen.

The invention claimed is:
1. An information display apparatus, comprising:
a data input monitoring means that monitors whether or not a data input device is connected to the apparatus;
a data storing means that stores data inputted from the data input device; and
an electronic conference system that displays information in a plurality of display modes including a whiteboard mode for editing an image object and modes available for operating an electronic conference system, wherein the data input monitoring means further comprises a display mode determining means that determines whether or not the electronic conference system is operating in the whiteboard mode, and a data type determining means that determines a data type of the data inputted from the data input device and stored on the data storing means, and wherein, when the data input device is connected to the apparatus, the display mode determining means determines whether or not the electronic conference system is operating in the whiteboard mode, and when the display mode determining means determines that the electronic conference system is operating in the whiteboard mode, if the data type determining means determines that the data inputted from the data input device and stored on the data storing means is of an image data type, then without user input, the electronic conference system displays the data stored on the data storing means as an image object, when the display mode determining means determines that the electronic conference system is not operating in the whiteboard mode, then without user input, the electronic conference system displays a data storing dialogue for prompting a user to indicate the portion for storing said data; and when the display mode determining means determines that the electronic conference system is operating in the whiteboard mode and the data type determining means determines that the data is of a type other than the image data, then without user input, the electronic conference system displays the data storing dialogue for prompting the user to indicate the portion for storing said data.

* * * * *